United States Patent
Huang

(10) Patent No.: US 10,313,050 B2
(45) Date of Patent: Jun. 4, 2019

(54) PHASE ESTIMATION METHOD AND APPARATUS FOR POLARIZATION MULTIPLEXING SYSTEM

(71) Applicant: Huawei Technologies Co., Ltd., Shenzhen (CN)

(72) Inventor: Yuanda Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/852,940

(22) Filed: Dec. 22, 2017

(65) Prior Publication Data

US 2018/0123725 A1    May 3, 2018

Related U.S. Application Data

(63) Continuation of application No. PCT/CN2015/082063, filed on Jun. 23, 2015.

(51) Int. Cl.
| | |
|---|---|
| *H04B 10/06* | (2006.01) |
| *H04J 14/06* | (2006.01) |
| *H04B 10/2507* | (2013.01) |
| *H04L 7/00* | (2006.01) |
| *H04B 10/61* | (2013.01) |

(52) U.S. Cl.
CPC .......... *H04J 14/06* (2013.01); *H04B 10/2507* (2013.01); *H04B 10/6165* (2013.01); *H04B 10/6166* (2013.01); *H04L 7/0075* (2013.01)

(58) Field of Classification Search
CPC ...... H04J 14/06; H04J 14/02; H04B 10/6166; H04B 10/611; H04B 10/614; H04B 10/6161; H04B 10/6971; H04B 10/532
USPC ....... 398/202, 204, 205, 206, 207, 208, 209, 398/183, 188, 184, 65, 152, 79, 25, 135, 398/136, 158, 159
See application file for complete search history.

(56) References Cited

U.S. PATENT DOCUMENTS

| | | | |
|---|---|---|---|
| 9,716,564 B2* | 7/2017 | Schmogrow | H04J 14/06 |
| 2008/0145063 A1 | 6/2008 | Li et al. | |
| 2011/0033184 A1 | 2/2011 | Zhang et al. | |
| 2011/0255870 A1* | 10/2011 | Grigoryan | H04B 10/548 398/65 |

(Continued)

FOREIGN PATENT DOCUMENTS

| | | |
|---|---|---|
| CN | 102725982 A | 10/2012 |
| CN | 102870353 A | 1/2013 |

(Continued)

OTHER PUBLICATIONS

Machine Translation and Abstract of Chinese Publication No. CN103312645, Sep. 18, 2013, 10 pages.

(Continued)

*Primary Examiner* — Hanh Phan
(74) *Attorney, Agent, or Firm* — Conley Rose, P.C.

(57) ABSTRACT

A phase estimation method and apparatus for a polarization multiplexing system, where the method includes performing, by a receive end, state of polarization (SOP) rotation on a received first SOP signal and second SOP signal according to an angle of previous SOP rotation, extracting a pilot using adaptive filtering, and performing carrier phase estimation according to the extracted pilot. This prevents a noise signal from being extracted and can make a carrier phase estimation result more accurate.

18 Claims, 6 Drawing Sheets

(56) References Cited

U.S. PATENT DOCUMENTS

| | | | |
|---|---|---|---|
| 2011/0274442 A1* | 11/2011 | Zhang | H04B 10/0779 |
| | | | 398/208 |
| 2012/0039606 A1 | 2/2012 | Grigoryan et al. | |
| 2013/0322870 A1 | 12/2013 | Geyer et al. | |
| 2014/0376917 A1 | 12/2014 | Grigoryan et al. | |
| 2015/0023659 A1* | 1/2015 | Sun | H04J 14/0221 |
| | | | 398/34 |
| 2017/0019206 A1 | 1/2017 | Bianciotto et al. | |

FOREIGN PATENT DOCUMENTS

| | | |
|---|---|---|
| CN | 103139128 A | 6/2013 |
| CN | 103312645 A | 9/2013 |
| CN | 103634049 A | 3/2014 |
| CN | 104168069 A | 11/2014 |
| CN | 104365039 A | 2/2015 |
| CN | 104486277 A | 4/2015 |
| EP | 2613460 A1 | 7/2013 |

OTHER PUBLICATIONS

Machine Translation and Abstract of Chinese Publication No. CN104168069, Nov. 26, 2014, 23 pages.

Machine Translation and Abstract of Chinese Publication No. CN104486277, Apr. 1, 2015, 13 pages.

Xie, C., "Transmission of 128-Gb/s PDM-4PAM Generated with Electroabsoption Modulators over 960-km Standard Single-Mode Fiber," Optical Society of America, 2014, 3 pages.

Zhang, X., "Digital Signal Processing for Optical Coherent Communication Systems", DTU Fotonik Department of Photonics Engineering Technical University of Denmark, Apr. 27, 2012, 149 pages.

Foreign Communication From a Counterpart Application, PCT Application No. PCT/CN2015/082063, English Translation of International Search Report dated Mar. 24, 2016, 2 pages.

Foreign Communication From a Counterpart Application, PCT Application No. PCT/CN2015/082063, English Translation of Written Opinion dated Mar. 24, 2016, 4 pages.

Foreign Communication From a Counterpart Application, European Application No. 15895896.7, Extended European Search Report dated Jun. 6, 2018, 8 pages.

Machine Translation and Abstract of Chinese Publication No. CN103139128, Jun. 5, 2013, 9 pages.

Foreign Communication From A Counterpart Application, Chinese Application No. 201580080799.2, Chinese Office Action dated Mar. 29, 2019, 18 pages.

* cited by examiner

PHASE ESTIMATION METHOD AND APPARATUS FOR POLARIZATION MULTIPLEXING SYSTEM

CROSS-REFERENCE TO RELATED APPLICATION

This application is a continuation of International Patent Application No. PCT/CN2015/082063 filed on Jun. 23, 2015, which is hereby incorporated by reference in its entirety.

TECHNICAL FIELD

The present disclosure relates to communications technologies, and in particular, to a phase estimation method and apparatus for a polarization multiplexing system.

BACKGROUND

In digital signal processing (DSP) of a high-rate communications system for polarization multiplexing coherent optical transmission, carrier phase noise compensation is a key technology. Increasingly high spectral efficiency requires that a signal be compressed in a narrower spectrum for transmission, thereby causing serious signal distortion and further increasing difficulty of carrier phase noise compensation. In addition, regarding metropolitan transmission, a 10 gigabits (Gb) on/off keying (OOK) modulation channel will exist on a network for a long term, causing serious non-linear carrier phase noise to a channel that uses coherent transmission. Therefore, resolving these problems in carrier phase noise compensation is of great significance to future polarization multiplexing coherent optical transmission, and in particular, to metropolitan polarization multiplexing coherent optical transmission.

In other approaches, a pilot-based carrier phase noise compensation method is generally used in a coherent communications system. Further, in this method, a transmit end inserts a pilot of a specific frequency into a signal, in DSP at a receive end, a digital band-pass filter first extracts the pilot from a signal carrying the pilot, phase noise is then estimated according to the pilot, and the phase noise is finally used to compensate the signal, to obtain a compensated signal.

However, there are two orthogonal state of polarization (SOP) signals in a polarization multiplexing system. If the pilot-based carrier phase noise compensation method used in the coherent communications system in the other approaches is applied to the polarization multiplexing system, pilots in the two SOP signals counteract each other at some specific polarization angles and differential group delay (DGD) values, because of impact of link SOP rotation and a DGD in the polarization multiplexing system. Consequently, a pilot in one SOP signal disappears, and a pilot in the other SOP signal is strengthened. As a result, a pilot extracted in a subsequent pilot extraction process is noise in the SOP signal whose pilot disappears. Therefore, phase estimation cannot be performed accurately, and performance of the polarization multiplexing system is degraded.

SUMMARY

Embodiments of the present disclosure provide a phase estimation method and apparatus for a polarization multiplexing system in order to resolve a problem that phase estimation cannot be performed accurately and therefore performance of a polarization multiplexing system is degraded.

A first aspect of the present disclosure provides a phase estimation method for a polarization multiplexing system, including performing, by a receive end, SOP rotation on a received first SOP signal and second SOP signal according to an angle of previous SOP rotation, and extracting a pilot by means of adaptive filtering, and performing, by the receive end, carrier phase estimation according to the extracted pilot, where the first SOP signal and the second SOP signal are orthogonal polarization signals.

A second aspect of the present disclosure provides a phase estimation apparatus for a polarization multiplexing system, including a processing module configured to perform SOP rotation on a received first SOP signal and second SOP signal according to an angle of previous SOP rotation, and extract a pilot by means of adaptive filtering, and a phase estimation module configured to perform carrier phase estimation according to the extracted pilot, where the first SOP signal and the second SOP signal are orthogonal polarization signals.

A third aspect of the present disclosure provides a phase estimation apparatus for a polarization multiplexing system, including a processor configured to perform SOP rotation on a received first SOP signal and second SOP signal according to an angle of previous SOP rotation, and extract a pilot by means of adaptive filtering, and perform carrier phase estimation according to the extracted pilot, where the first SOP signal and the second SOP signal are orthogonal polarization signals.

According to the phase estimation method and apparatus for a polarization multiplexing system that are provided in the embodiments, the receive end performs SOP rotation on the received first SOP signal and second SOP signal according to the angle of the previous SOP rotation, and then extracts the pilot by means of adaptive filtering. Therefore, digital compensation is performed on the SOP rotation according to the angle of the previous SOP rotation in order to strengthen pilot power, and then the pilot is extracted by means of adaptive filtering, preventing a noise signal from being extracted. In this way, carrier phase estimation is performed according to the extracted pilot, making a carrier phase estimation result more accurate.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and persons of ordinary skill in the art may still derive other drawings from these accompanying drawings without creative efforts.

DESCRIPTION OF EMBODIMENTS

Figure 1:
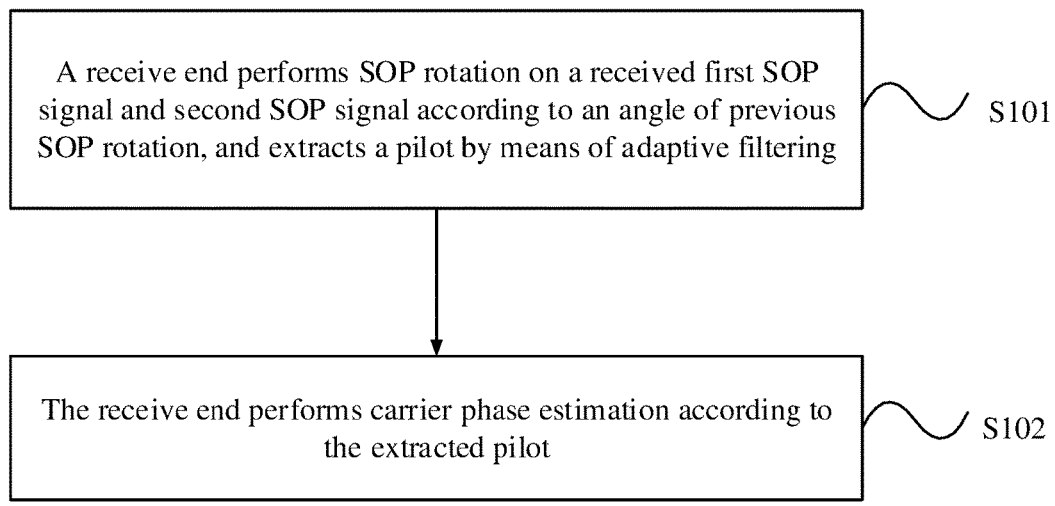
FIG. 1 is a schematic flowchart of a first embodiment of a phase estimation method for a polarization multiplexing system according to the present disclosure.

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

In a polarization multiplexing system, after a receive end receives an optical signal sent by a transmit end, the optical signal is converted into an electrical signal by an integrated coherent receiver (ICR), and then the electrical signal is converted into a digital signal by means of analog-to-digital conversion. The digital signal includes two polarization multiplexing signals X and Y (that is, a first SOP signal and a second SOP signal in the following). The two SOP signals sequentially undergo dispersion compensation, adaptive equalization, decision, and the like in a process. In this process, phase estimation and carrier phase noise compensation need to be performed on the two SOP signals.

The carrier phase noise compensation may be performed after the dispersion compensation and before the adaptive equalization. Alternatively, the adaptive equalization may be first performed after the dispersion compensation, and then the carrier phase noise compensation may be performed after the adaptive equalization. A carrier phase noise compensation manner may be as follows: conversion into the electrical signal by the ICR→conversion into the digital signal by means of analog-to-digital conversion→dispersion compensation→adaptive equalization→carrier phase noise compensation→decision, or conversion into the electrical signal by the ICR→conversion into the digital signal by means of analog-to-digital conversion→dispersion compensation→carrier phase noise compensation→adaptive equalization→decision. In addition, the phase estimation may be performed after the conversion into the digital signal by means of analog-to-digital conversion or after the dispersion compensation. The carrier phase noise compensation is performed using a phase estimation result.

Further, the transmit end inserts a pilot into a signal. The receive end subsequently performs phase estimation according to the extracted pilot. The transmit end may insert the pilot using multiple methods: (1) The pilot is inserted into a digital signal using a digital pilot generator, a digital signal into which the pilot has been inserted is converted into an analog signal by means of digital-to-analog conversion, the analog signal is input into a modulator, and an optical signal is obtained after modulation and is sent to the receive end. (2) A digital signal is converted into an analog signal, the pilot is inserted into the analog signal using an analog pilot generator, an analog signal into which the pilot has been inserted is input into a modulator, and an optical signal is obtained after modulation and is sent to the receive end. (3) An optical signal is modulated using a compulsory modulation system, an optical signal obtained after modulation includes a direct current item, and the receive end may use the direct current item as a pilot.

The inserted pilot may be a single-sideband pilot, a double-sideband pilot, or multiple pilots. This is not limited herein.

FIG. 1 is a schematic flowchart of a first embodiment of a phase estimation method for a polarization multiplexing system according to the present disclosure. As shown in FIG. 1, the method includes the following steps.

Step S101: A receive end performs SOP rotation on a received first SOP signal and second SOP signal according to an angle of previous SOP rotation, and extracts a pilot by means of adaptive filtering.

Further, the receive end may extract a pilot with the highest power by means of adaptive filtering.

Step S102: The receive end performs carrier phase estimation according to the extracted pilot.

Further, an SOP rotation formula may be $$\begin{bmatrix} \cos(\theta) & \sin(-\theta) \\ \sin(\theta) & \cos(\theta) \end{bmatrix} \begin{bmatrix} Xin \\ Yin \end{bmatrix}, \quad \text{(formula 1)}$$

where $\theta$ is an SOP rotation angle, Xin indicates the first SOP signal, and Yin indicates the second SOP signal. When $\theta$ is 45 degrees, that is, $$\begin{bmatrix} \cos(\theta) & \sin(-\theta) \\ \sin(\theta) & \cos(\theta) \end{bmatrix} \begin{bmatrix} Xin \\ Yin \end{bmatrix} = \frac{\sqrt{2}}{2} \begin{bmatrix} Xin - Yin \\ Xin + Yin \end{bmatrix},$$

a pilot in one SOP signal is counteracted.

An entire phase estimation process is actually a continuous circulation and iteration process. In a pilot extraction process, by tracking the angle of the previous SOP rotation, digital compensation may be performed on the SOP rotation, and pilot power of one SOP signal may be strengthened. In this embodiment of the present disclosure, a pilot of only one SOP signal in the two SOP signals needs to be extracted for carrier phase estimation in order to ensure accuracy of pilot extraction and prevent noise of the SOP signal whose pilot is counteracted from being extracted. Therefore, provided that a pilot in the first SOP signal Xin is kept, a compensation formula may be expressed as follows:

$$\begin{bmatrix} \cos(\theta) & \sin(\theta) \\ \sin(-\theta) & \cos(\theta) \end{bmatrix} \left( \begin{bmatrix} \cos(\theta) & \sin(-\theta) \\ \sin(\theta) & \cos(\theta) \end{bmatrix} \begin{bmatrix} Xin \\ Yin \end{bmatrix} \right) = \begin{bmatrix} Xin \\ Yin \end{bmatrix}.$$

It should be noted that coefficients $\cos(\theta)$ and $\sin(\theta)$ that are obtained by tracking the angle of the SOP rotation are merely specific expressions, and in an actual implementation, any value that maximizes power of a pilot and prevents the pilot from disappearing may be used as a coefficient.

After a carrier phase estimation result is obtained, carrier phase noise compensation may be performed on the first SOP signal and the second SOP signal using the phase estimation result.

The first SOP signal and the second SOP signal are orthogonal polarization signals.

In this embodiment, the receive end performs SOP rotation on the received first SOP signal and second SOP signal according to the angle of the previous SOP rotation, and then extracts the pilot by means of adaptive filtering. Therefore, digital compensation is performed on the SOP rotation according to the angle of the previous SOP rotation in order to strengthen the pilot power, and then the pilot is extracted by means of adaptive filtering, preventing a noise signal from being extracted. In this way, carrier phase estimation is performed according to the extracted pilot, making the carrier phase estimation result more accurate.

In a specific implementation process, performing, by a receive end, SOP rotation on a received first SOP signal and second SOP signal according to an angle of previous SOP rotation, and extracting a pilot by means of adaptive filtering may be sequentially performed by two devices, or may be performed by one device at one time.

(1) The receive end may perform SOP rotation and adaptive filtering at one time using a 2×1 adaptive filter and extract the pilot. Further, the receive end may perform SOP rotation on the received first SOP signal and second SOP signal using a formula $Z_2=Xin*hx+Yin*hy$, and by means of adaptive filtering, track an angle of the SOP rotation and extract the pilot, where $Z_2$ indicates the pilot, Xin indicates the first SOP signal, Yin indicates the second SOP signal, hx and hy indicate adaptive filtering coefficients obtained according to the angle of the previous SOP rotation, hx and hy are coefficients that are continuously updated and improved in an iteration process.

Further, after the receive end performs SOP rotation on the received first SOP signal and second SOP signal according to the angle of the previous SOP rotation, and extracts the pilot by means of adaptive filtering, the receive end may further calculate an error according to the pilot to obtain an error calculation result, and may further track the angle of the current SOP rotation according to the error calculation result, and update the adaptive filtering coefficients. Therefore, iteration continues to be performed according to updated adaptive filtering coefficients.

The receive end may update the adaptive filtering coefficients using a formula $hx'=hx-\mu_2 \cdot conj(Xin) \cdot err$ and a formula $hy'=hy-\mu_2 \cdot conj(Yin) \cdot err$, where hx' and hy' indicate the updated adaptive filtering coefficients, err indicates the error calculation result, conj(Xin) indicates a conjugate number of the first SOP signal, conj(Yin) indicates a conjugate number of the second SOP signal, and $\mu_2$ indicates a unit update step of the adaptive filtering coefficients, that is, updating is performed in a unit of $\mu_2$ each time in a process of updating the adaptive filtering coefficients.

(2) The receive end may perform SOP rotation and adaptive filtering in two steps. Further, the receive end performs SOP rotation on the received first SOP signal and second SOP signal according to the angle of the previous SOP rotation to obtain an SOP signal that is obtained after the rotation, and then the receive end extracts, by means of adaptive filtering, the pilot from the SOP signal that is obtained after the rotation.

It should be noted that, in an initial state, an angle of SOP rotation may be a preset value. In a subsequent iteration and circulation process, an error is calculated according to an extracted pilot, and SOP estimation is performed according to an error calculation result, that is, an angle of previous SOP rotation is tracked by means of SOP estimation, and an SOP rotation angle is continuously compensated.

In a specific implementation process, the receive end may perform SOP rotation on the received first SOP signal and second SOP signal using a formula $Z_1=a \cdot Xin+b \cdot Yin$ to obtain the SOP signal $Z_1$ that is obtained after the rotation, where Xin indicates the first SOP signal, Yin indicates the second SOP signal, a and b are weighting coefficients obtained according to the angle of the previous SOP rotation. It should be noted that $Z_1=a \cdot Xin+b \cdot Yin$ is equivalent to the foregoing formula 1. The coefficients $\cos(\theta)$ and $\sin(\theta)$ in the formula 1 are expressed as a and b herein.

Correspondingly, the receive end may extract, using a formula $Z_2=Z_1*h$, the pilot from the SOP signal that is obtained after the rotation, where $Z_1$ indicates the SOP signal that is obtained after the rotation, $Z_2$ indicates the pilot, h indicates an adaptive filtering coefficient, and * indicates convolution.

Certainly, the foregoing embodiment does not constitute a limitation.

It can be learned that, in the foregoing method for performing SOP rotation and adaptive filtering at one time using a 2×1 adaptive filter, the coefficients hx and by may be considered as a combination of h and a and b in this embodiment.

Further, after the receive end extracts, by means of adaptive filtering, the pilot from the SOP signal that is obtained after the rotation, the receive end may further calculate an error according to the pilot to obtain an error calculation result, and further track an angle of the current SOP rotation according to the error calculation result, and update the weighting coefficients and the adaptive filtering coefficient.

The receive end may update the weighting coefficients using a formula $a'=a-\mu_1 \cdot conj(Xin) \cdot err$ and a formula $b'=b-\mu_1 \cdot conj(Yin) \cdot err$, and update the adaptive filtering coefficient using a formula $h'=h-\mu_2 \cdot conj(Z_1) \cdot err$, where a' and b' indicate updated weighting coefficients, h' indicates an updated adaptive filtering coefficient, $Z_1$ indicates the SOP signal that is obtained after the rotation, conj(Xin) indicates a conjugate number of the first SOP signal, conj(Yin) indicates a conjugate number of the second SOP signal, conj($Z_1$) indicates a conjugate number of the SOP signal that is obtained after the rotation, err indicates the error calculation result, $\mu_1$ indicates a unit update step of the weighting coefficients, and $\mu_2$ indicates a unit update step of the adaptive filtering coefficient, that is, the weighting coefficients may be updated in a unit of $\mu_1$, and the adaptive filtering coefficient may be updated in a unit of $\mu_2$.

In another embodiment, the receive end may calculate the error using a different algorithm. Further, calculating, by the receive end, an error according to the pilot signal to obtain an error calculation result may be: (a) based on the Constant Modulus Algorithm, where the receive end calculates the error using a formula $err=(|Z_2|^2-P_{av}) \cdot Z_2$ to obtain the error calculation result err, where $Z_2$ indicates the pilot, and $P_{av}$ indicates a preset power value, or $P_{av}$ may be initially a preset value, and after the polarization multiplexing system is stable, $P_{av}$ may be an average power of the extracted pilot, or (b) based on a least mean square algorithm, where the receive end calculates the error using a formula $err=Z_2-S \cdot e^{j\hat{\theta}}$ to obtain the error calculation result err, where $Z_2$ indicates the pilot, S indicates a time domain sequence for sending the pilot, $\hat{\theta}$ indicates a phase estimation value, and j indicates an imaginary part of a complex number.

When the extracted pilot is a sine or cosine signal, S=1.

Figure 2:
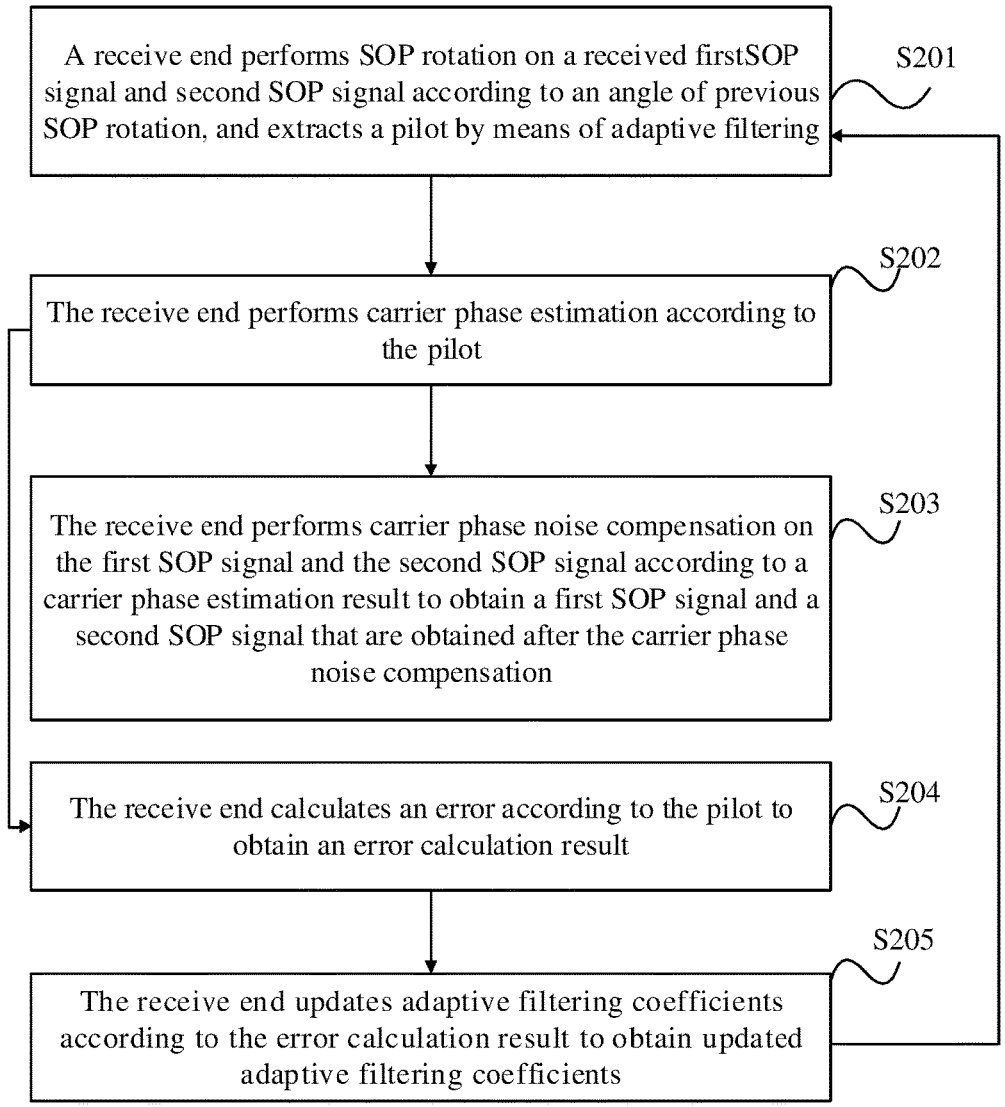
FIG. 2 is a schematic flowchart of a second embodiment of a phase estimation method for a polarization multiplexing system according to the present disclosure.

FIG. 2 is a schematic flowchart of a second embodiment of a phase estimation method for a polarization multiplexing system according to the present disclosure. As shown in FIG. 2, the method includes the following steps.

Step S201: A receive end performs SOP rotation on a received first SOP signal and second SOP signal according to an angle of previous SOP rotation, and extracts a pilot by means of adaptive filtering.

Step S202: The receive end performs carrier phase estimation according to the pilot.

There are two branch steps after step S202. In one branch step, step S204 is performed, that is, an adaptive filtering coefficient is circularly updated after an error is calculated. In the other branch step, step S203 is performed, that is, carrier phase noise compensation is performed.

Step S203: The receive end performs carrier phase noise compensation on the first SOP signal and the second SOP signal according to a carrier phase estimation result to obtain a first SOP signal and a second SOP signal that are obtained after the carrier phase noise compensation.

Step S204: The receive end calculates an error according to the pilot to obtain an error calculation result.

Step S205: The receive end updates adaptive filtering coefficients according to the error calculation result to obtain updated adaptive filtering coefficients, and then may go back to perform step S201 and continue to perform iteration and circulation.

Figure 3:
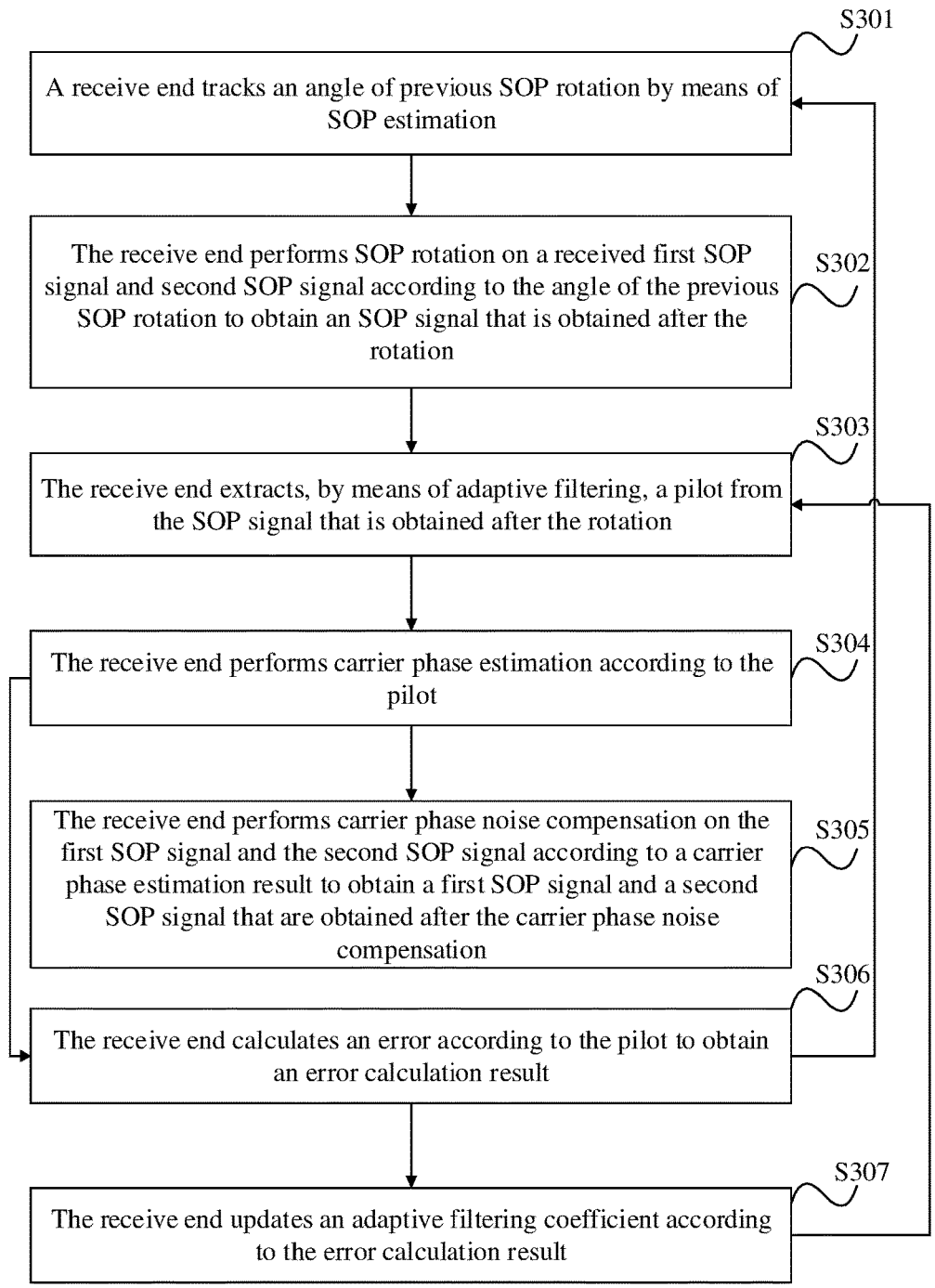
FIG. 3 is a schematic flowchart of a third embodiment of a phase estimation method for a polarization multiplexing system according to the present disclosure.

FIG. 3 is a schematic flowchart of a third embodiment of a phase estimation method for a polarization multiplexing system according to the present disclosure. As shown in FIG. 3, the method includes the following steps.

Step S301: A receive end tracks an angle of previous SOP rotation by means of SOP estimation.

Step S302: The receive end performs SOP rotation on a received first SOP signal and second SOP signal according to the angle of the previous SOP rotation to obtain an SOP signal that is obtained after the rotation.

Step S303: The receive end extracts, by means of adaptive filtering, a pilot from the SOP signal that is obtained after the rotation.

Step S304: The receive end performs carrier phase estimation according to the pilot.

There are two branch steps after step S304. In one branch step, step S306 is performed, that is, an error is calculated. In the other branch step, step S305 is performed, that is, carrier phase noise compensation is performed.

Step S305: The receive end performs carrier phase noise compensation on the first SOP signal and the second SOP signal according to a carrier phase estimation result to obtain a first SOP signal and a second SOP signal that are obtained after the carrier phase noise compensation.

Step S306: The receive end calculates an error according to the pilot, to obtain an error calculation result. There are also two branch steps after step S306. In one branch step, step S307 continues to be performed. In the other branch step, step S301 is performed again, that is, the receive end performs SOP estimation according to the error calculation result, tracks an angle of current SOP rotation, and performs iteration and circulation.

Further, when performing phase estimation again according to the error calculation result, the receive end updates weighting coefficients required for SOP rotation.

Step S307: The receive end updates an adaptive filtering coefficient according to the error calculation result, and then may go back to perform step S303 and perform iteration and circulation.

Further, on a basis of the foregoing embodiment, before the receive end performs SOP rotation on the received first SOP signal and second SOP signal, the receive end may further perform pre-filtering on the received first SOP signal and second SOP signal to filter out some interference in the first SOP signal and the second SOP signal in order to better extract the pilot in a subsequent process.

In another embodiment, in the polarization multiplexing system, clock synchronization may be further performed on a transmit end and the receive end on a basis of the foregoing embodiment. Further, the receive end may determine, according to the pilot, a clock phase error between the receive end and the transmit end of the first SOP signal and the second SOP signal. Further, the clock phase error may be obtained by calculation according to time stamp information in the extracted pilot. Further, the receive end performs clock phase adjustment according to the clock phase error such that clock phases of the transmit end and the receive end are synchronous.

Further, the receive end performs clock phase adjustment using multiple methods, for example, in the following manners.

(1) The receive end adjusts a clock source of the receive end according to the clock phase error such that clock phase of the transmit end and the receive end are synchronous. The clock source sends synchronized clock information to a module that performs analog-to-digital conversion on a received SOP signal.

(2) The receive end delays the first SOP signal and the second SOP signal according to the clock phase error such that clock phase of the transmit end and the receive end are synchronous. That is, a clock source is not changed, however, the first SOP signal and the second SOP signal are delayed to compensate the clock phase error.

Further, delaying the first SOP signal and the second SOP signal according to the clock phase error may include that after the receive end receives an optical signal, the optical signal is converted into an electrical signal by an ICR, the electrical signal is converted into a digital signal by means of analog-to-digital conversion, and then the digital signal is delayed, where the digital signal includes the first SOP signal and the second SOP signal. After the delaying, dispersion compensation and SOP rotation are performed.

(3) With reference to (1) and (2), according to the clock phase error, the receive end adjusts a clock source of the receive end, and delays the first SOP signal and the second SOP signal such that clock phase of the transmit end and the receive end are synchronous. In a specific implementation process, adjustment may be performed in two steps coarse adjustment first and then fine adjustment. For example, the receive end first adjusts the clock source to complete coarse adjustment, and then delays the first SOP signal and the second SOP signal to complete fine adjustment, or first delays the first SOP signal and the second SOP signal to complete coarse adjustment, and then adjusts the clock source to complete fine adjustment. This does not constitute a limitation.

The clock source sends synchronized clock information to a module that performs analog-to-digital conversion on a received SOP signal.

It should be noted that, after obtaining the clock phase error according to the pilot, the receive end may perform loop filtering to suppress noise to obtain an accurate clock phase error.

Figure 4:
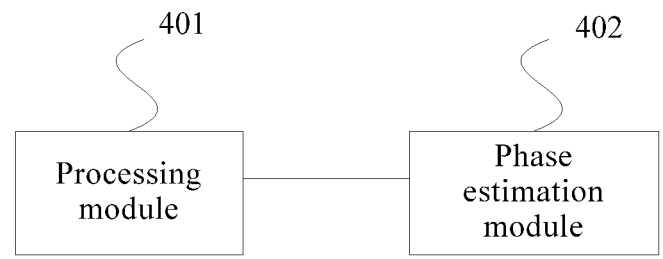
FIG. 4 is a schematic structural diagram of a first embodiment of a phase estimation apparatus for a polarization multiplexing system according to the present disclosure.

FIG. 4 is a schematic structural diagram of a first embodiment of a phase estimation apparatus for a polarization multiplexing system according to the present disclosure. As shown in FIG. 4, the apparatus includes a processing module 401 and a phase estimation module 402.

The processing module 401 is configured to perform SOP rotation on a received first SOP signal and second SOP signal according to an angle of previous SOP rotation, and extract a pilot by means of adaptive filtering.

The phase estimation module 402 is configured to perform carrier phase estimation according to the extracted pilot.

The first SOP signal and the second SOP signal are orthogonal polarization signals.

In this embodiment, a receive end performs SOP rotation on the received first SOP signal and second SOP signal according to the angle of the previous SOP rotation, and then extracts the pilot by means of adaptive filtering. Therefore, digital compensation is performed on the SOP rotation according to the angle of the previous SOP rotation in order to strengthen pilot power, and then the pilot is extracted by means of adaptive filtering, preventing a noise signal from being extracted. In this way, carrier phase estimation is performed according to the extracted pilot, making a carrier phase estimation result more accurate.

Figure 5:
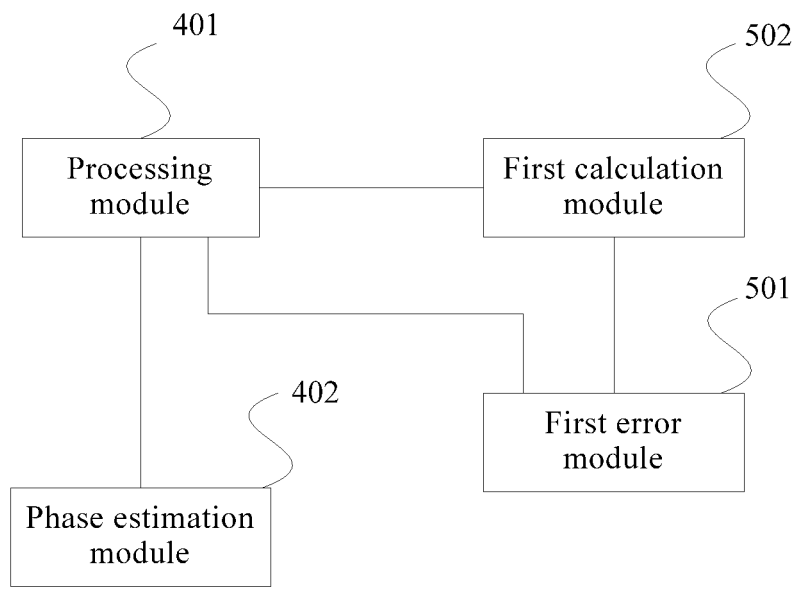
FIG. 5 is a schematic structural diagram of a second embodiment of a phase estimation apparatus for a polarization multiplexing system according to the present disclosure.

FIG. 5 is a schematic structural diagram of a second embodiment of a phase estimation apparatus for a polarization multiplexing system according to the present disclosure. On a basis of FIG. 4, the apparatus may further include a first error module 501 and a first calculation module 502.

In this embodiment, the processing module 401 is further configured to perform SOP rotation on the received first SOP signal and second SOP signal using a formula $Z_2=Xin*hx+Yin*hy$, and by means of adaptive filtering, track an angle of the SOP rotation and extract the pilot, where $Z_2$ indicates the pilot, Xin indicates the first SOP signal, Yin indicates the second SOP signal, and hx and hy indicate adaptive filtering coefficients obtained according to the angle of the previous SOP rotation. In this embodiment, the processing module 401 may be a 2×1 adaptive filter.

The first error module 501 is configured to calculate an error according to the pilot to obtain an error calculation result.

The first calculation module 502 is configured to track the angle of the current SOP rotation according to the error calculation result, and update the adaptive filtering coefficients.

The first calculation module 502 updates the adaptive filtering coefficients using a formula $hx'=hx-\mu_2 \cdot conj(Xin) \cdot err$ and a formula $hy'=hy-\mu_2 \cdot conj(Yin) \cdot err$, where hx' and hy' indicate updated adaptive filtering coefficients, err indicates the error calculation result, conj(Xin) indicates a conjugate number of the first SOP signal, conj(Yin) indicates a conjugate number of the second SOP signal, and $\mu_2$ indicates a unit update step of the adaptive filtering coefficients.

Figure 6:
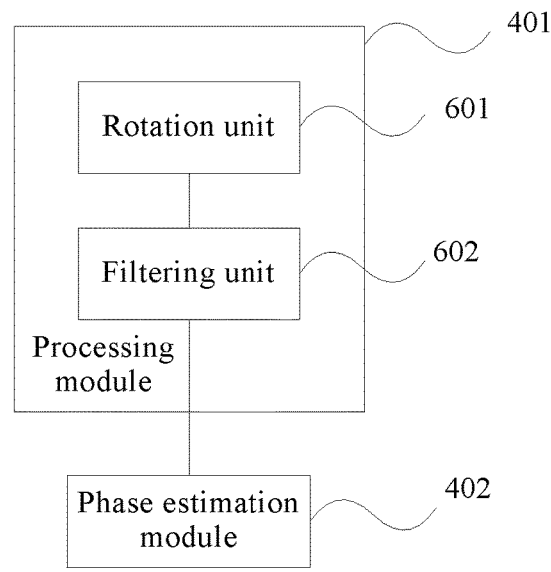
FIG. 6 is a schematic structural diagram of a third embodiment of a phase estimation apparatus for a polarization multiplexing system according to the present disclosure.

FIG. 6 is a schematic structural diagram of a third embodiment of a phase estimation apparatus for a polarization multiplexing system according to the present disclosure. On a basis of FIG. 4, the processing module 401 may include a rotation unit 601 and a filtering unit 602. The filtering unit 602 may be an adaptive filter.

The rotation unit 601 is configured to perform SOP rotation on the received first SOP signal and second SOP signal according to the angle of the previous SOP rotation to obtain an SOP signal that is obtained after the rotation.

The filtering unit 602 is configured to extract, by means of adaptive filtering, the pilot from the SOP signal that is obtained after the rotation.

The rotation unit 601 is further configured to perform SOP rotation on the received first SOP signal and second SOP signal using a formula $Z_1=a \cdot Xin+b \cdot Yin$ to obtain the SOP signal $Z_1$ that is obtained after the rotation, where Xin indicates the first SOP signal, Yin indicates the second SOP signal, a and b are weighting coefficients obtained according to the angle of the previous SOP rotation.

The filtering unit 602 is further configured to extract, using a formula $Z_2=Z_1*h$, the pilot from the SOP signal that is obtained after the rotation, where $Z_1$ indicates the SOP signal that is obtained after the rotation, $Z_2$ indicates the pilot, h indicates an adaptive filtering coefficient, and * indicates convolution.

Figure 7:
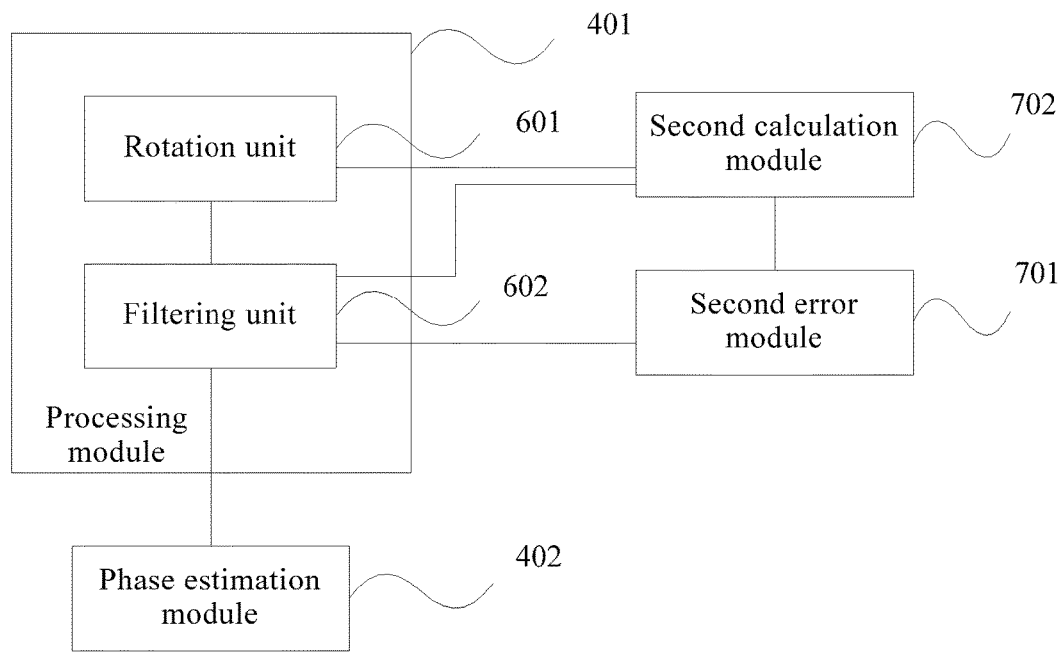
FIG. 7 is a schematic structural diagram of a fourth embodiment of a phase estimation apparatus for a polarization multiplexing system according to the present disclosure.

FIG. 7 is a schematic structural diagram of a fourth embodiment of a phase estimation apparatus for a polarization multiplexing system according to the present disclosure. On a basis of FIG. 6, the apparatus may further include a second error module 701 and a second calculation module 702.

The second error module 701 is configured to calculate an error according to the pilot to obtain an error calculation result.

The second calculation module 702 is configured to track an angle of the current SOP rotation according to the error calculation result, and update the weighting coefficients and the adaptive filtering coefficient.

The second calculation module 702 updates the weighting coefficients using a formula $a'=a-\mu_1 \cdot conj(Xin) \cdot err$ and a formula $b'=b-\mu_1 \cdot conj(Yin) \cdot err$, and updates the adaptive filtering coefficient using a formula $h'=h-\mu_2 \cdot conj(Z_1) \cdot err$, where a' and b' indicate updated weighting coefficients, h' indicates an updated adaptive filtering coefficient, $Z_1$ indicates the SOP signal that is obtained after the rotation, conj(Xin) indicates a conjugate number of the first SOP signal, conj(Yin) indicates a conjugate number of the second SOP signal, $conj(Z_1)$ indicates a conjugate number of the SOP signal that is obtained after the rotation, err indicates the error calculation result, indicates a unit update step of the weighting coefficients, and $\mu_2$ indicates a unit update step of the adaptive filtering coefficient.

It should be noted that a principle of the first error module 501 is similar to that of the second error module 701. The first error module 501 is further configured to calculate the error using a formula $err=(|Z_2|^2-P_{av}) \cdot Z_2$ to obtain the error calculation result err, where $Z_2$ indicates the pilot, and $P_{av}$ indicates a preset power value, or calculate the error using a formula $err=Z_2-S \cdot e^{j\hat{\theta}}$, to obtain the error calculation result err, where $Z_2$ indicates the pilot, S indicates a time domain sequence in which a transmit end sends the pilot, $\hat{\theta}$ indicates a phase estimation value, and j indicates an imaginary part of a complex number.

Likewise, the second error module 701 calculates the error using a formula $err=(|Z_2|^2-P_{av}) \cdot Z_2$ to obtain the error calculation result err, where $Z_2$ indicates the pilot, and $P_{av}$ indicates a preset power value, or calculates the error using a formula $err=Z_2-S \cdot e^{j\hat{\theta}}$ to obtain the error calculation result err, where $Z_2$ indicates the pilot, S indicates a time domain sequence in which a transmit end sends the pilot, $\hat{\theta}$ indicates a phase estimation value, and j indicates an imaginary part of a complex number.

Figure 8:
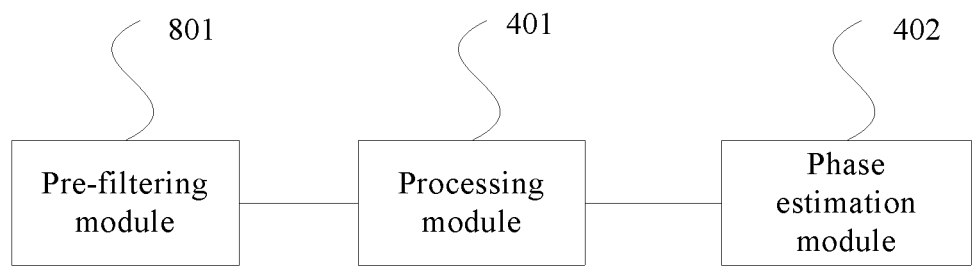
FIG. 8 is a schematic structural diagram of a fifth embodiment of a phase estimation apparatus for a polarization multiplexing system according to the present disclosure.

FIG. 8 is a schematic structural diagram of a fifth embodiment of a phase estimation apparatus for a polarization multiplexing system according to the present disclosure. As shown in FIG. 8, on a basis of FIG. 4, the apparatus may further include a pre-filtering module 801 configured to perform pre-filtering on the received first SOP signal and second SOP signal before the processing module 401 performs SOP rotation on the received first SOP signal and second SOP signal.

Figure 9:
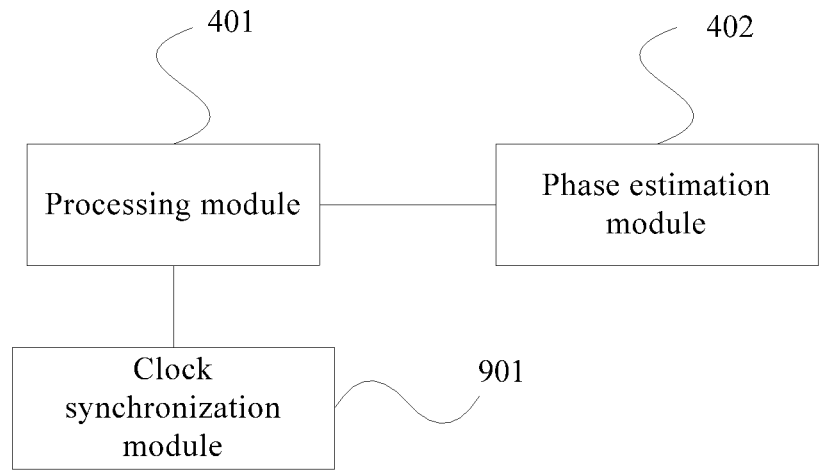
FIG. 9 is a schematic structural diagram of a sixth embodiment of a phase estimation apparatus for a polarization multiplexing system according to the present disclosure.

FIG. 9 is a schematic structural diagram of a sixth embodiment of a phase estimation apparatus for a polarization multiplexing system according to the present disclosure. As shown in FIG. 9, on a basis of FIG. 4, the apparatus may further include a clock synchronization module 901 and after the processing module 401 extracts the pilot by means of adaptive filtering, the clock synchronization module 901 is configured to determine, according to the pilot, a clock phase error between a receive end and a transmit end of the first SOP signal and the second SOP signal, and perform clock phase adjustment according to the clock phase error such that clock phases of the transmit end and the receive end are synchronous.

The clock synchronization module 901 adjusts a clock source of the receive end according to the clock phase error such that clock phase of the transmit end and the receive end are synchronous, or delays the first SOP signal and the second SOP signal according to the clock phase error such that clock phase of the transmit end and the receive end are synchronous, or according to the clock phase error, adjusts a clock source of the receive end and delays the first polarization signal and the second polarization signal such that clock phase of the transmit end and the receive end are synchronous.

The apparatus is configured to execute the foregoing method embodiments. An implementation principle and a technical effect of the apparatus are similar to those of the method embodiments. Details are not described herein.

An embodiment of the present disclosure further provides a phase estimation apparatus for a polarization multiplexing system, including a processor. The processor is configured to perform SOP rotation on a received first SOP signal and second SOP signal according to an angle of previous SOP rotation, and extract a pilot by means of adaptive filtering, and perform carrier phase estimation according to the extracted pilot, where the first SOP signal and the second SOP signal are orthogonal polarization signals.

In this embodiment, a receive end performs SOP rotation on the received first SOP signal and second SOP signal according to the angle of the previous SOP rotation, and then extracts the pilot by means of adaptive filtering. Therefore, digital compensation is performed on the SOP rotation according to the angle of the previous SOP rotation in order to strengthen pilot power, and then the pilot is extracted by means of adaptive filtering, preventing a noise signal from being extracted. In this way, carrier phase estimation is performed according to the extracted pilot, making a carrier phase estimation result more accurate.

In an embodiment, the processor may include a 2×1 adaptive filter, and is configured to perform SOP rotation on the received first SOP signal and second SOP signal according to the angle of the previous SOP rotation, and extract the pilot by means of adaptive filtering. Further, the processor performs SOP rotation on the received first SOP signal and second SOP signal using a formula $Z_2=Xin*hx+Yin*hy$, and by means of adaptive filtering, tracks an angle of the SOP rotation and extracts the pilot, where $Z_2$ indicates the pilot, Xin indicates the first SOP signal, Yin indicates the second SOP signal, hx and hy indicate adaptive filtering coefficients obtained according to the angle of the previous SOP rotation.

Further, the processor is configured to calculate an error according to the pilot, to obtain an error calculation result, and track the angle of the current SOP rotation according to the error calculation result, and update the adaptive filtering coefficients. Further, the processor updates the adaptive filtering coefficients using a formula $hx'=hx-\mu_2 \cdot conj(Xin) \cdot err$ and a formula $hy'=hy-\mu_2 \cdot conj(Yin) \cdot err$, where hx' and hy' indicate updated adaptive filtering coefficients, err indicates the error calculation result, conj(Xin) indicates a conjugate number of the first SOP signal, conj(Yin) indicates a conjugate number of the second SOP signal, and $\mu_2$ indicates a unit update step of the adaptive filtering coefficients.

In another embodiment, the processor is further configured to perform SOP rotation on the received first SOP signal and second SOP signal according to the angle of the previous SOP rotation, to obtain an SOP signal that is obtained after the rotation, and extract, by means of adaptive filtering, the pilot from the SOP signal that is obtained after the rotation. The processor may include an adaptive filter that extracts, by means of adaptive filtering, the pilot from the SOP signal that is obtained after the rotation.

Further, the processor performs SOP rotation on the received first polarization signal and second polarization signal using a formula $Z_1=a \cdot Xin+b \cdot Yin$ to obtain the SOP signal Z that is obtained after the rotation, where Xin indicates the first SOP signal, Yin indicates the second SOP signal, a and b are weighting coefficients obtained according to the angle of the previous SOP rotation, and extracts, using a formula $Z_2=Z_1*h$, the pilot from the SOP signal that is obtained after the rotation, where $Z_1$ indicates the SOP signal that is obtained after the rotation, $Z_2$ indicates the pilot, h indicates an adaptive filtering coefficient, and * indicates convolution.

Further, the processor calculates an error according to the pilot to obtain an error calculation result, and tracks an angle of the current SOP rotation according to the error calculation result, and updates the weighting coefficients and the adaptive filtering coefficient. The processor is further configured to update the weighting coefficients using a formula $a'=a-\mu_1 \cdot conj(Xin) \cdot err$ and a formula $b'=b-\mu_1 \cdot conj(Yin) \cdot err$, and update the adaptive filtering coefficient using a formula where $h'=h-\mu_2 \cdot conj(Z_1) \cdot err$, where a' and B' indicate updated weighting coefficients, H' indicates an updated adaptive filtering coefficient, $Z_1$ indicates the SOP signal that is obtained after the rotation, conj(Xin) indicates a conjugate number of the first SOP signal, conj(Yin) indicates a conjugate number of the second SOP signal, conj($Z_1$) indicates a conjugate number of the SOP signal that is obtained after the rotation, err indicates the error calculation result, $\mu_1$ indicates a unit update step of the weighting coefficients, and $\mu_2$ indicates a unit update step of the adaptive filtering coefficient.

In another embodiment, the processor is further configured to calculate the error using a formula $err=(|Z_2|^2-P_{av}) \cdot Z_2$ to obtain the error calculation result err, where $Z_2$ indicates the pilot, and $P_{av}$ indicates a preset power value, or calculate the error using a formula $err=Z_2-S \cdot e^{j \cdot \hat{\theta}}$ to obtain the error calculation result err, where $Z_2$ indicates the pilot, S indicates a time domain sequence in which a transmit end sends the pilot, $\hat{\theta}$ indicates a phase estimation value, and indicates an imaginary part of a complex number.

In another embodiment, before performing SOP rotation on the received first SOP signal and second SOP signal, the processor is further configured to perform pre-filtering on the received first SOP signal and second SOP signal.

The apparatus may further perform clock synchronization using the extracted pilot. Further, after extracting the pilot by means of adaptive filtering, the processor determines, according to the pilot, a clock phase error between the receive end and a transmit end of the first SOP signal and the second SOP signal, and performs clock phase adjustment according to the clock phase error such that clock phases of the transmit end and the receive end are synchronous.

Further, a clock source of the receive end may be adjusted according to the clock phase error such that clock phase of the transmit end and the receive end are synchronous, or the first SOP signal and the second SOP signal are delayed according to the clock phase error such that clock phase of the transmit end and the receive end are synchronous, or a clock source of the receive end is adjusted according to the clock phase error, and the first polarization signal and the second polarization signal are delayed according to the clock phase error such that clock phase of the transmit end and the receive end are synchronous.

In the several embodiments provided in the present disclosure, it should be understood that the disclosed apparatus and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the shown or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separated, and parts shown as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) or a processor to perform some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A phase estimation method for a polarization multiplexing system, comprising:
   performing, by a receive end, state of polarization (SOP) rotation on a received first SOP signal (Xin) and a second SOP signal (Yin) according to an angle of previous SOP rotation;
   extracting, by the receive end, a pilot ($Z_2$) using adaptive filtering, the SOP rotation being performed and the $Z_2$ being extracted by:
      performing, by the receive end, the SOP rotation on the received Xin and the Yin using a formula $Z_2$=Xin*hx+Yin*hy;
      tracking, by the receive end using the adaptive filtering, an angle of the SOP rotation; and
      extracting the $Z_2$ by the receive end using the adaptive filtering, the hx and the hy indicating adaptive filtering coefficients obtained according to the angle of the previous SOP rotation; and
   performing, by the receive end, carrier phase estimation according to the $Z_2$, the Xin and the Yin being orthogonal polarization signals.

2. The method of claim 1, wherein after performing the SOP rotation and extracting the $Z_2$, the method further comprises:
   calculating, by the receive end, an error according to the $Z_2$ to obtain an error calculation result (err);
   tracking, by the receive end, the angle of the SOP rotation according to the error calculation result; and
   updating, by the receive end, the hx and the hy.

3. The method of claim 2, wherein updating the hx and the hy comprises updating, by the receive end, the hx and the hy using a formula hx'=hx$-\mu_2 \cdot$conj(Xin)$\cdot$err and a formula hy'=hy$-\mu_2 \cdot$conj(Yin)$\cdot$err, the hx' and the hy' indicating updated adaptive filtering coefficients, the conj(Xin) indicating a conjugate number of the Xin, the conj(Yin) indicating a conjugate number of the Yin, and the $\mu_2$ indicating a unit update step of the hr and the hy.

4. The method of claim 1, wherein performing the SOP rotation and extracting the $Z_2$ further comprises:
   performing, by the receive end, the SOP rotation on the received Xin and the Yin according to the angle of the previous SOP rotation to obtain an SOP signal ($Z_1$) after the SOP rotation; and
   extracting, by the receive end using the adaptive filtering, the $Z_2$ from the $Z_1$.

5. The method of claim 1, wherein before performing the SOP rotation, the method further comprises performing, by the receive end, pre-filtering on the received Xin and the Yin.

6. The method of claim 1, wherein after extracting the $Z_2$, the method further comprises:
   determining, by the receive end according to the $Z_2$, a clock phase error between the receive end and a transmit end of the Xin and the Yin; and
   performing, by the receive end, clock phase adjustment according to the clock phase error such that clock phases of the transmit end and the receive end are synchronous.

7. The method of claim 6, wherein performing the clock phase adjustment comprises:
   adjusting, by the receive end, a clock source of the receive end according to the clock phase error such that the clock phases of the transmit end and the receive end are synchronous;

delaying, by the receive end, the Xin and the Yin according to the clock phase error such that the clock phases of the transmit end and the receive end are synchronous; or adjusting, by the receive end, the clock source of the receive end according to the clock phase error, and delaying the Xin and the Yin according to the clock phase error such that the clock phases of the transmit end and the receive end are synchronous.

8. A phase estimation method for a polarization multiplexing system, comprising:
performing, by a receive end, state of polarization (SOP) rotation on a received first SOP signal (Xin) and a second SOP signal (Yin) according to an angle of previous SOP rotation;
extracting, by the receive end, a pilot ($Z_2$) using adaptive filtering, the SOP rotation being performed and the $Z_2$ being extracted by:
performing, by the receive end, the SOP rotation on the received Xin and the Yin according to the angle of the previous SOP rotation to obtain an SOP signal ($Z_1$) after the SOP rotation;
extracting, by the receive end using the adaptive filtering, the $Z_2$ from the $Z_1$; and
performing, by the receive end, the SOP rotation on the received Xin and the Yin using a formula $Z_1=a\cdot Xin+b\cdot Yin$, the a and the b being weighting coefficients obtained according to the angle of the previous SOP rotation, the $Z_2$ being extracted from the $Z_1$ comprising extracting, by the receive end using a formula $Z_2=Z_1*h$, the $Z_2$ from the $Z_1$, the h indicating an adaptive filtering coefficient, and the * indicating convolution; and
performing, by the receive end, carrier phase estimation according to the $Z_2$, the Xin and the Yin being orthogonal polarization signals.

9. The method of claim 8, wherein after extracting the $Z_2$ from the $Z_1$, the method further comprises:
calculating, by the receive end, an error according to the $Z_2$ to obtain an error calculation result;
tracking, by the receive end, an angle of the SOP rotation according to the error calculation result; and
updating, by the receive end, the weighting coefficients and the adaptive filtering coefficient.

10. A phase estimation apparatus for a polarization multiplexing system, comprising:
a non-transitory computer-readable storage medium storing instructions; and
a processor coupled to the non-transitory computer-readable storage medium, the instructions causing the processor to be configured to:
perform state of polarization (SOP) rotation on a received first SOP signal (Xin) and a second SOP signal (Yin) according to an angle of previous SOP rotation;
extract a pilot ($Z_2$) using adaptive filtering, the SOP rotation being performed and the $Z_2$ being extracted by:
performing the SOP rotation on the received Xin and the Yin using a formula $Z_2=Xin*hx+Yin*hy$;
tracking, using the adaptive filtering, an angle of the SOP rotation; and
extracting, using the adaptive filtering, the $Z_2$, the hx and the hy indicating adaptive filtering coefficients obtained according to the angle of the previous SOP rotation; and perform carrier phase estimation according to the extracted $Z_2$, the Xin and the Yin being orthogonal polarization signals.

11. The apparatus of claim 10, wherein the instructions further cause the processor to be configured to:
calculate an error according to the pilot to obtain an error calculation result (err);
track the angle of the SOP rotation according to the err; and
update the hx and the hy.

12. The apparatus of claim 11, wherein the instructions further cause the processor to be configured to update the hx and the hy using a formula $hx'=hx-\mu_2\cdot conj(Xin)\cdot err$ and a formula $hy'=hy-\mu_2\cdot conj(Yin)\cdot err$, the hx' and the hy' indicating updated adaptive filtering coefficients, the conj(Xin) indicating a conjugate number of the Xin, the conj(Yin) indicating a conjugate number of the Yin, and the $\mu_2$ indicating a unit update step of the hx and the hy.

13. The apparatus of claim 10, wherein when performing the SOP rotation and extracting the $Z_2$, the instructions further cause the processor to be configured to:
perform the SOP rotation on the received Xin and the Yin according to the angle of the previous SOP rotation to obtain an SOP signal ($Z_1$) after the SOP rotation; and
extract, using the adaptive filtering, the $Z_2$ from the $Z_1$.

14. The apparatus of claim 13, wherein the instructions further cause the processor to be configured to:
perform SOP rotation on the received Xin and the Yin using a formula $Z_1=a\cdot Xin+b\cdot Yin$ to obtain the $Z_1$, the a and the b being weighting coefficients obtained according to the angle of the previous SOP rotation; and
extract, using a formula $Z_2=Z_1*h$, the $Z_2$ from the $Z_1$, the h indicating an adaptive filtering coefficient, and the * indicating convolution.

15. The apparatus of claim 14, wherein the instructions further cause the processor to be configured to:
calculate an error according to the $Z_2$ to obtain an error calculation result;
track an angle of the SOP rotation according to the error calculation result; and
update the weighting coefficients and the adaptive filtering coefficient.

16. The apparatus of claim 10, wherein before performing the SOP rotation on the received Xin and the Yin, the instructions further cause the processor to be configured to perform pre-filtering on the received Xin and the Yin.

17. The apparatus of claim 10, wherein after extracting the $Z_2$, the instructions further cause the processor to be configured to:
determine, according to the $Z_2$, a clock phase error between the receive end and a transmit end of the Xin and the Yin; and
perform clock phase adjustment according to the clock phase error such that clock phases of the transmit end and the receive end are synchronous.

18. The apparatus of claim 17, wherein the instructions further cause the processor to be configured to:
adjusting a clock source of the receive end according to the clock phase error such that the clock phases of the transmit end and the receive end are synchronous;
delaying the Xin and the Yin according to the clock phase error such that the clock phases of the transmit end and the receive end are synchronous; or
adjusting the clock source of the receive end according to the clock phase error, and delay the Xin and the Yin such that the clock phases of the transmit end and the receive end are synchronous.

* * * * *